United States Patent
Zeng et al.

(10) Patent No.: US 11,462,039 B2
(45) Date of Patent: Oct. 4, 2022

(54) METHOD, DEVICE, AND STORAGE MEDIUM FOR OBTAINING DOCUMENT LAYOUT

(71) Applicant: BEIJING BAIDU NETCOM SCIENCE AND TECHNOLOGY CO., LTD., Beijing (CN)

(72) Inventors: Kai Zeng, Beijing (CN); Hua Lu, Beijing (CN); Yiyu Peng, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 57 days.

(21) Appl. No.: 17/129,531

(22) Filed: Dec. 21, 2020

(65) Prior Publication Data

US 2021/0374397 A1 Dec. 2, 2021

(30) Foreign Application Priority Data

Jun. 1, 2020 (CN) .......................... 202010484261.0

(51) Int. Cl.
*G06K 9/00* (2022.01)
*G06K 9/62* (2022.01)
(Continued)

(52) U.S. Cl.
CPC ......... *G06V 30/414* (2022.01); *G06K 9/6257* (2013.01); *G06V 10/457* (2022.01); *G06V 30/10* (2022.01)

(58) Field of Classification Search
CPC .... G06V 30/414; G06V 10/457; G06V 30/10; G06K 9/6257
See application file for complete search history.

(56) References Cited

U.S. PATENT DOCUMENTS

2006/0136491 A1 6/2006 Berkner et al.
2008/0187240 A1 8/2008 Takebe et al.
(Continued)

FOREIGN PATENT DOCUMENTS

WO 2007080642 A1 7/2007

OTHER PUBLICATIONS

Extended European Search Report for Application No. 21150293.5, dated Jun. 28, 2021, 9 pages.
(Continued)

*Primary Examiner* — David F Dunphy
(74) *Attorney, Agent, or Firm* — Fay Sharpe LLP

(57) ABSTRACT

The disclosure may provide a method for obtaining a document layout, an electronic device, and a storage medium. The method may include: obtaining a plurality of characters and character information of each of the plurality of characters in a target document; generating a character fully-connected graph based on the plurality of characters and the character information of each of the plurality of characters; obtaining a spatial semantic feature of each of the plurality of characters; generating types of character vertices based on the character information of each of the plurality of characters; generating types of edges based on the spatial semantic feature of each of the plurality of characters, and the character information of each of the plurality of characters; and obtaining a document layout of the target document based on the types of the character vertices and the types of the edges.

14 Claims, 10 Drawing Sheets

(51) Int. Cl.
    *G06K 9/46*     (2006.01)
    *G06V 30/414*     (2022.01)
    *G06V 10/44*     (2022.01)
    *G06V 30/10*     (2022.01)

(56) References Cited

U.S. PATENT DOCUMENTS

2008/0317337 A1    12/2008  Wang et al.
2020/0410231 A1*  12/2020  Chua ................... G06V 30/414

OTHER PUBLICATIONS

Mengxi Wei et al., "Robust Layout-aware IE for Visually Rich Documents with Pre-Trained Language Models", May 22, 2020, 10 pages.
Office Action for Japanese Application No. 2021-089265, dated Jun. 14, 2022, 4 pages.

* cited by examiner

METHOD, DEVICE, AND STORAGE MEDIUM FOR OBTAINING DOCUMENT LAYOUT

CROSS-REFERENCE TO RELATED APPLICATION

This application claims priority to Chinese Patent Application No. 202010484261.0, filed on Jun. 1, 2020, the entire disclosure of which is incorporated herein by reference.

TECHNICAL FIELD

The disclosure generally relates to the field of computer technologies, and particular to the fields of natural language processing and deep learning technologies, and more particular to a method for obtaining a document layout, an electronic device, and a storage medium.

BACKGROUND

Document layout analysis is indispensable for understanding the content of the document. Many tasks for understanding the content of the document are based on the accurate layout analysis. For example, it is known that the document has a layout of two columns, thus the correct text sequence may be obtained; and it is known that a certain region of the document has a table and relationships among cells of the table, thus the content of the table may be understood correctly. It may be seen that how to accurately obtain the document layout is crucial.

SUMMARY

Embodiments of the disclosure in a first aspect provide a method for obtaining a document layout. The method includes: obtaining a plurality of characters and character information of each of the plurality of characters in a target document; generating a character fully-connected graph based on the plurality of characters and the character information of each of the plurality of characters, in which the character fully-connected graph includes a plurality of character vertices and edges among the plurality of character vertices; obtaining a spatial semantic feature of each of the plurality of characters; generating types of the character vertices based on the character information of each of the plurality of characters; generating types of the edges based on the spatial semantic feature of each of the plurality of characters, and the character information of each of the plurality of characters; and obtaining a document layout of the target document based on the types of the character vertices and the types of the edges.

Embodiments of the disclosure in a second aspect provide an electronic device. The electronic device includes: at least one processor, and a storage device communicatively connected to the at least one processor. The storage device stores instructions executable by the at least one processor, and when the instructions are executed by the at least one processor, the at least one processor is caused to implement: obtaining a plurality of characters and character information of each of the plurality of characters in a target document; generating a character fully-connected graph based on the plurality of characters and the character information of each of the plurality of characters, in which the character fully-connected graph includes a plurality of character vertices and edges among the plurality of character vertices; obtaining a spatial semantic feature of each of the plurality of characters; generating types of the character vertices based on the character information of each of the plurality of characters; generating types of the edges based on the spatial semantic feature of each of the plurality of characters, and the character information of each of the plurality of characters; and obtaining a document layout of the target document based on the types of the character vertices and the types of the edges.

Embodiments of the disclosure in a third aspect provide a computer-readable storage medium storing computer instructions. When the instructions are executed, a computer is caused to implement the method, and the method includes: obtaining a plurality of characters and character information of each of the plurality of characters in a target document; generating a character fully-connected graph based on the plurality of characters and the character information of each of the plurality of characters, in which the character fully-connected graph includes a plurality of character vertices and edges among the plurality of character vertices; obtaining a spatial semantic feature of each of the plurality of characters; generating types of the character vertices based on the character information of each of the plurality of characters; generating types of the edges based on the spatial semantic feature of each of the plurality of characters, and the character information of each of the plurality of characters; and obtaining a document layout of the target document based on the types of the character vertices and the types of the edges.

It should be understood that the content described in this section is not intended to identify the key or important features of the embodiments of the disclosure, nor is it intended to limit the scope of the disclosure. Additional features of the disclosure will be easily understood by the following description.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the disclosure with reference to the accompanying drawings, which includes various details of the embodiments of the disclosure to facilitate understanding and shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

A method for obtaining a document layout, an apparatus for obtaining a document layout, an electronic device, and a storage medium, provided in the embodiments of the disclosure, will be described in the following with reference to the accompanying drawings.

With the method provided in the embodiments of the disclosure, a plurality of characters and character information of the plurality of characters in a target document may be obtained. The obtained characters and character information may be used to generate a character fully-connected graph. Types of the plurality of character vertices may be generated based on the character information of the plurality of characters, and types of the edges may be generated based on the obtained spatial semantic feature and the character information. A document layout of the target document may be obtained based on the types of the character vertices and the types of the edges. Therefore, by analyzing the document layout based on the character information, semantic information, and spatial location information, the document layout is generated, thereby making full use of the information to search for the global optimal solution and improving the accuracy of document layout analysis.

Figure 1:
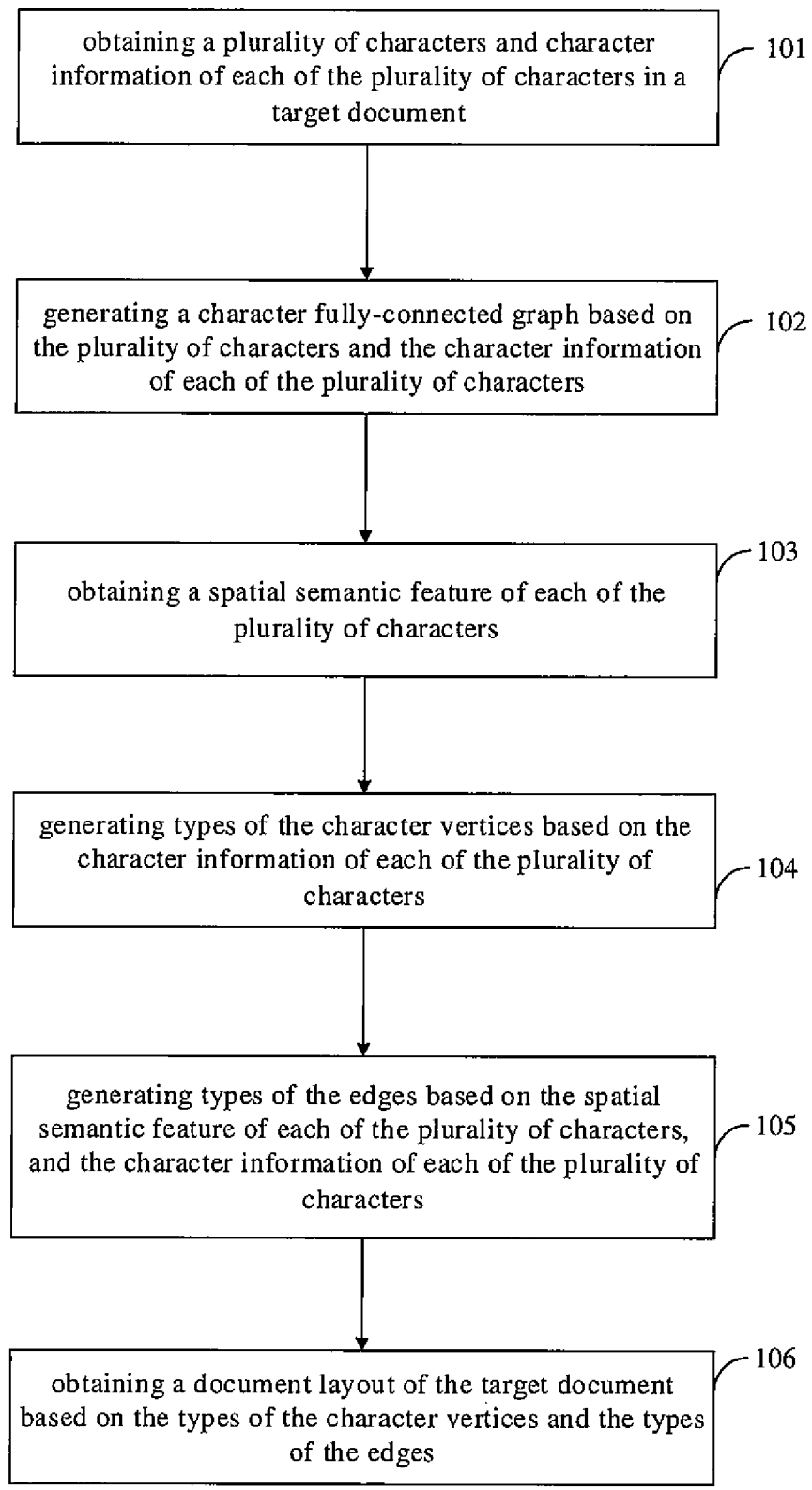
FIG. 1 is a flowchart illustrating a method for obtaining a document layout according to embodiments of the disclosure.

FIG. 1 is a flowchart illustrating a method for obtaining a document layout according to embodiments of the disclosure.

The method for obtaining the document layout according to the embodiments of the disclosure may be executed by an apparatus for obtaining a document layout according to embodiments of the disclosure. The apparatus may be configured in an electronic device to make full use of the character information, semantic information, and spatial location information to analyze the document layout.

As illustrated in FIG. 1, the method may include the following.

At block 101, a plurality of characters and character information of each of the plurality of characters in a target document are obtained.

In some embodiments, OCR (Optical Character Recognition) technology may be employed to recognize characters in a document whose layout needs to be analyzed. For ease of description, the document whose layout needs to be analyzed is called as the target document.

In detail, an image of the target document is obtained. The OCR technology is employed on the image to acquire the plurality of characters and the character information of the plurality of characters in the target document. The character may be text, a punctuation, a table, etc. The character information may include information such as the size of the character, the position of the character. The position of the character is the position of the character on the page of the current document, such as the row located by the character and which number in the row located by the character, or the position of the character is the pixel position of the character in the image.

At block 102, a character fully-connected graph is generated based on the plurality of characters and the character information of each of the plurality of characters, in which the character fully-connected graph includes a plurality of character vertices and edges among the plurality of character vertices.

In some embodiments, the character fully-connected graph with a two-dimensional plane may be obtained based on the obtained characters, and sizes, positions and other information of these obtained characters. In detail, each character is used as a fixed point, and the line between each character and each of other characters is used as an edge, so that the character fully-connected graph may be obtained. The character fully-connected graph includes the plurality of character vertices and the edges among the plurality of character vertices.

Figure 2:
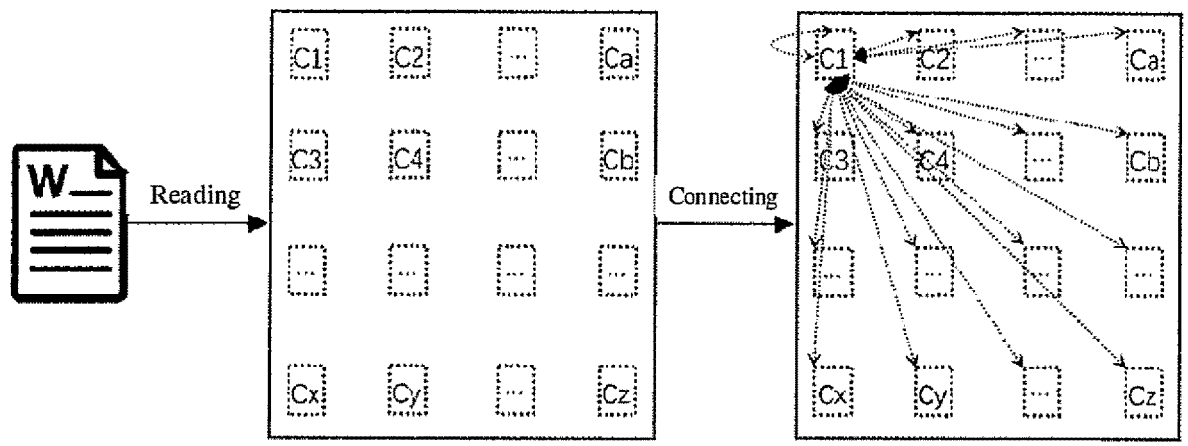
FIG. 2 is a diagram illustrating a process for obtaining a character fully-connected graph according to embodiments of the disclosure.

FIG. 2 is a diagram illustrating a process for obtaining a character fully-connected graph according to embodiments of the disclosure.

In FIG. 2, the document is read such that characters are obtained from the document, such as C1, C2, . . . , Ca, C3, C4, . . . , Cb, . . . , Cx, Cy, . . . , Cz. The connection is performed on the characters to obtain the edges. The character C1 is taken as an example in FIG. 2, and edges between the character C1 and the rest of the characters are illustrated, i.e., the two-way dashed arrows in FIG. 2.

At block 103, a spatial semantic feature of each of the plurality of characters is obtained. In order to make full use of the semantic information, in some embodiments, the spatial semantic feature of each character is obtained. The spatial semantic feature may be obtained by extracting the feature from the spatial semantic information. The spatial semantic information refers to the semantic information represented by the character on the two-dimensional spatial plane.

At block 104, types of the character vertices are generated based on the character information of each of the plurality of characters.

In some embodiments, the type of each character vertex (i.e., the vertex type of each character vertex) may be determined based on the character information of the plurality of characters, such as the positions of the characters. The vertex type may indicate the spatial position information of the character in the document.

In some embodiments, the vertex types may include: cell head, cell end, row head, row end, paragraph head, paragraph end, block head, block end, column head, column tail, etc. For example, if the character is at the beginning of a row of characters, the corresponding vertex type is the beginning of the row, i.e., the row head; if the character is the last character of the row of characters, the corresponding vertex type is the end of the row, i.e., the row end; if the character is the first character in the column of the document, the corresponding vertex type is the beginning of the column, i.e., the column head; and if the character is the last character in the column of the document, the corresponding vertex type is the end of the column, i.e., the column end.

It should be noted that some character vertices may be of multiple vertex types at the same time. For example, if a character is both the first character of a row and the first character of a paragraph, the corresponding types may be the row head and the paragraph head.

When determining the vertex types of the character vertexes, a pre-trained vertex type recognition model may also be used to determine the vertex types of the characters. In detail, the character information of the plurality of characters in the target document is input into the vertex type recognition model. The vertex type recognition model classifies each character vertex twice, and determines the vertex type of the character vertex according to the result of two classifications.

Two classifications refer to the classification task of two categories, usually called the two classification task. For example, there are five categories of cells, rows, paragraphs, blocks, and columns, and each category has two subcategories, i.e., head and end, so there are 10 categories. It is necessary to determine whether it is or not for each of these 10 categories during recognition. Therefore, each of the 10 categories is a two-classification. If it is not for these 10 categories, it is recognized as another category. For example, for a certain character vertex, the output of the vertex type recognition model is that, it is not the cell head, not the cell end, the paragraph head, not the paragraph end, not the block head, not the block end, the column head, and not the column end, so the vertex type of this character vertice is the paragraph head and the column head.

At block 105, types of the edges are generated based on the spatial semantic feature of each of the plurality of characters, and the character information of each of the plurality of characters.

Since the spatial semantic feature represents the semantic feature of the character, and the character information is the size and position of the character in the target document, the position information between the characters may be obtained according to the spatial semantic feature and character information of the characters, to make full use of the spatial position information. This position information may be represented by the type of the edge, i.e., the edge type.

The edge types may include: sequence, cell end to end, row end to end, paragraph end to end, block end to end, column end to end, etc.

Figure 3:
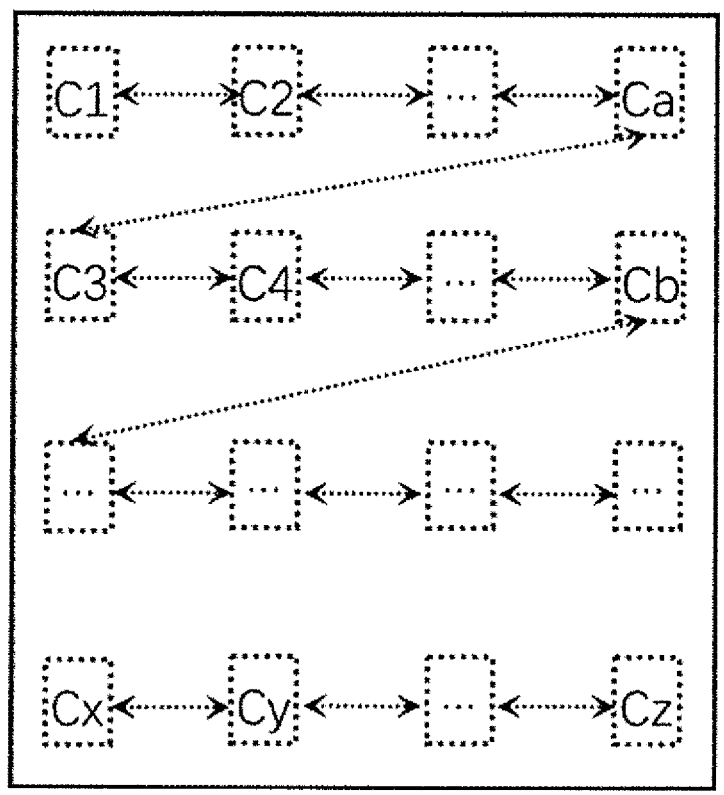
FIG. 3 is a diagram illustrating an edge type according to embodiments of the disclosure.
Figure 4:
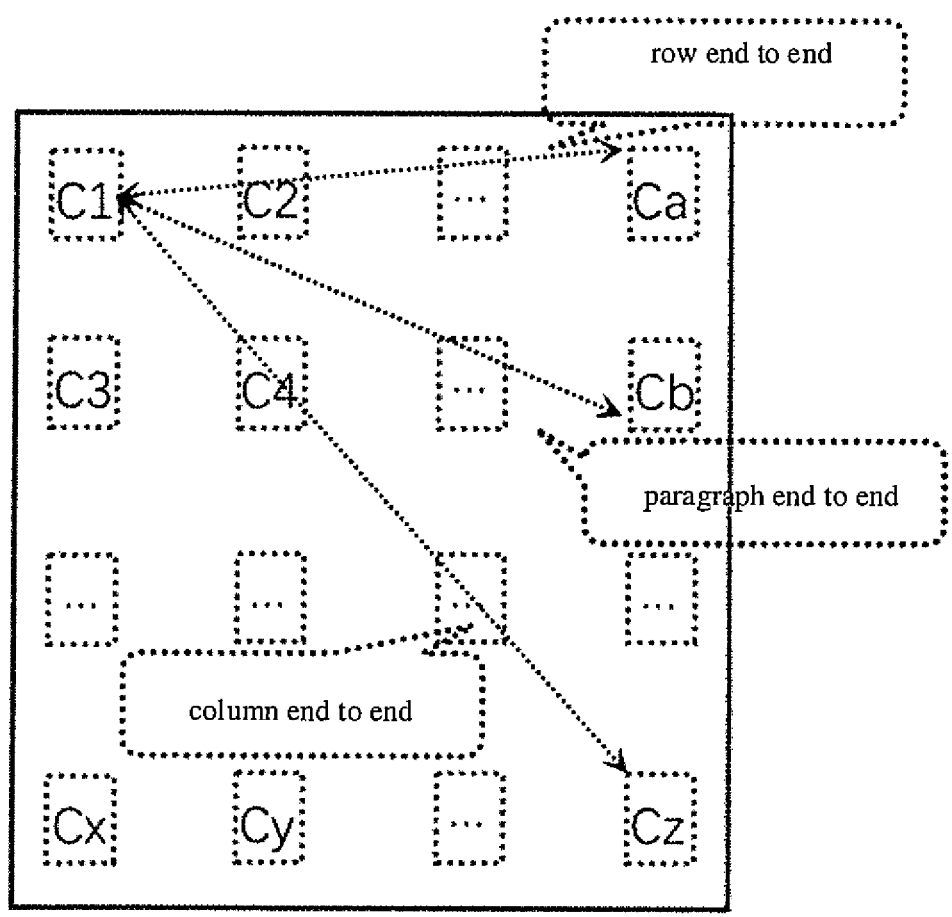
FIG. 4 is a diagram illustrating an edge type according to embodiments of the disclosure.

FIG. 3 is a diagram illustrating an edge type according to embodiments of the disclosure. FIG. 3 illustrates the edge type in the reading sequence. FIG. 4 is a diagram illustrating an edge type according to embodiments of the disclosure. FIG. 4 illustrates three edge types: row end to end, paragraph end to end, block end to end, column end to end. The type of the edge between C1 and Ca is the row end to end, the type of the edge between C1 and Cb is the paragraph end to end, and the type of the edge between C1 and Cz is the column end to end. The two-way arrow indicates that the joint probability of two directions between characters is used.

At block 106, a document layout of the target document is obtained based on the types of the character vertices and the types of the edges.

In some embodiments, after obtaining the vertex type of each character vertex and the edge type of each edge, the document layout of the target document may be obtained based on each vertex type and each edge type. In detail, the document layout may be generated based on preset rules. For example, the area occupied by the column may be determined based on the column head and the column end, and the edge of the column end to end, which may be as a part of the document. Then, the area occupied by the paragraph and the area of each paragraph in the column may be determined based on the paragraph head and the paragraph end, and the edge of the paragraph end to end.

Or, the document layout of the target document may be obtained based on a pre-trained document layout generation model. In detail, the vertex type of each character vertex in the character fully-connected graph and the edge type of each edge in the character fully-connected graph may be input into the document layout generation model. The document layout generation model outputs the corresponding document layout.

In some embodiments, these character information, spatial semantic information, and edge type spatial position information are fully utilized, and then the document layout is generated by comprehensive determining, which is globally optimized.

For example, for the document with a layout of left and right columns, when obtaining a certain character in the left column, it may use or more use the context in the left column to determine the character, instead of using the context in the right column, thereby synthesizing the information in the column to determine the character.

In the embodiments of the disclosure, the plurality of characters and the character information of the plurality of characters in the target document may be obtained. The obtained characters and character information may be used to generate the character fully-connected graph. Types of the plurality of character vertices may be generated based on the character information of the plurality of characters, and types of the edges may be generated based on the obtained spatial semantic feature and the character information. The document layout of the target document may be obtained based on the types of the character vertices and the types of the edges. Therefore, by analyzing the document layout based on the character information, semantic information, and spatial location information, the document layout is generated, thereby making full use of the information to search for the global optimal solution and improving the accuracy of document layout analysis.

In order to improve the accuracy of document layout analysis, when obtaining the spatial semantic feature of each of the plurality of characters, the model may be used to extract the corresponding spatial semantic feature in some embodiments of the disclosure.

In detail, the plurality of characters of the target document are input into a pre-established spatial language model, and the spatial semantic feature of each character is obtained through the spatial language model. The spatial language model may obtain the semantic feature of each character based on surrounding adjacent characters.

In the embodiments of the disclosure, when obtaining the spatial semantic feature of each of the plurality of characters, the plurality of characters may be inputted into the spatial language model to form the spatial semantic feature of each of the plurality of characters. Therefore, by using the spatial semantic features obtained through the spatial language model and the character information of the plurality of characters, the accuracy of the generated edge types is higher, thereby improving the accuracy of the document layout obtained based on the edge types.

Figure 5:
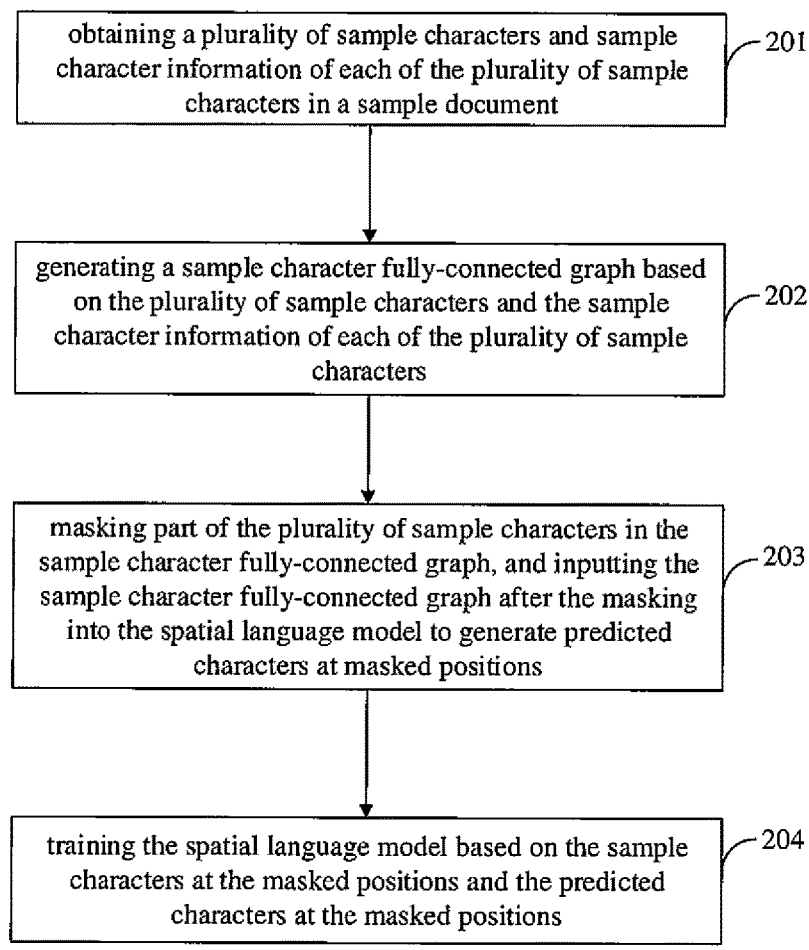
FIG. 5 is a flowchart illustrating a method for obtaining a document layout according to embodiments of the disclosure.

In some embodiments of the disclosure, the spatial language model may be obtained by training in the manner illustrated in FIG. 5. FIG. 5 is a flowchart illustrating a method for obtaining a document layout according to embodiments of the disclosure.

As illustrated in FIG. 5, the spatial language model may be trained through the following.

At block 201, a plurality of sample characters and sample character information of each of the plurality of sample characters in a sample document are obtained.

In some embodiments, the sample document may be a word document, a text document, a web page, etc. The sample document may include at least one type such as text, picture, and table.

In some embodiments, a large number of sample documents may be obtained by a manner of randomly generating layout styles and filling text. A large number of layout styles may be generated by controlling the layout forms. Various filling effects may be obtained by controlling text directions, page margins, paragraph spacing, row spacing, word spacing, etc. A large amount of text may be filled to obtain a large amount of unsupervised training data.

At block 202, a sample character fully-connected graph is generated based on the plurality of sample characters and the sample character information of each of the plurality of sample characters.

In some embodiments, obtaining the sample characters and sample character information in block 201 and block 202 is similar to obtaining the characters and character information in block 101 and block 102, which is not repeated herein.

At block 203, part of the plurality of sample characters in the sample character fully-connected graph is masked, and the sample character fully-connected graph after the masking is inputted into the spatial language model to generate predicted characters at masked positions.

In some embodiments, the part of the plurality of sample characters in the sample character fully-connected graph may be masked. For example, some characters are replaced with unknown characters, or modified with other characters. Then, the sample character fully-connected graph after the masking may be inputted into the spatial language model for prediction. The spatial language model outputs the predicted characters for the masked positions based on the unmasked characters in the sample character fully-connected graph.

Figure 6:
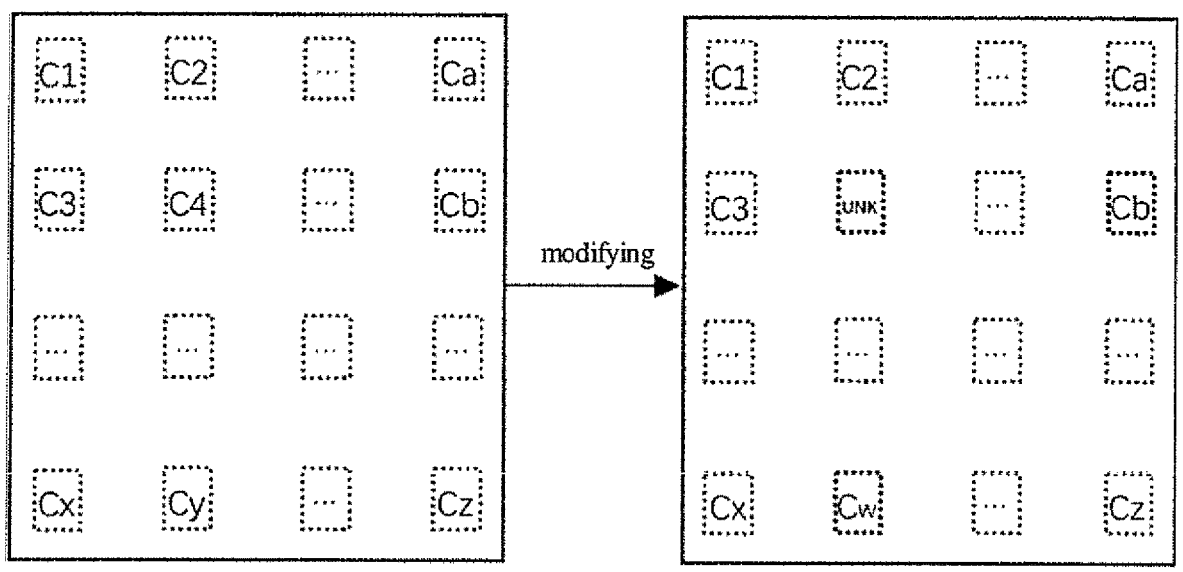
FIG. 6 is a diagram illustrating a process for masking characters according to embodiments of the disclosure.

FIG. 6 is a diagram illustrating a process for masking characters according to embodiments of the disclosure. In FIG. 6, the character C4 in the character fully-connected graph is modified to an unknown "UNK" character, Cb remains unchanged, and Cy is modified to any character Cw.

At block 204, the spatial language model is trained based on the sample characters at the masked positions and the predicted characters at the masked positions.

In some embodiments, the loss value is calculated according to the sample characters at the masked positions and the predicted characters at the masked positions. If the loss value is greater than the preset first loss threshold, the parameters of the spatial language model are adjusted. Then, the part of the characters in the sample character fully-connected graph of the next sample document is masked, and then the sample character fully-connected graph after the masking may be inputted to the adjusted spatial language model. After that, the loss value is calculated based on the sample characters at the masked positions and the predicted characters at the masked positions. It is further determined whether the loss value is greater than the preset first loss threshold. If it is greater than the preset first loss threshold, the parameters of the spatial language model are adjusted and the training is continued until the loss value is less than the preset first loss threshold, and the training ends.

Therefore, even if some characters are masked, the spatial language model obtained through training may predict these characters from the surrounding characters.

In some embodiments of the disclosure, the part of the plurality of sample characters in the sample character fully-connected graph of the sample document may be masked, and the sample character fully-connected graph after the masking is inputted into the spatial language model for prediction to generate the predicted characters at the masked positions. The spatial language model is trained based on the sample characters at the masked positions and the predicted characters at the masked positions. Thus, training is performed through the sample character fully-connected graph after masking part of the plurality of corresponding sample characters, so that the trained spatial language model may predict the character at a certain position based on the characters surrounding the certain position.

In order to improve the accuracy of document layout analysis, when generating the types of the edges based on the spatial semantic feature of each of the plurality of characters, and the character information of each of the plurality of characters, an edge type recognition model may also be used to obtain the types of the edges in some embodiments of the disclosure.

In detail, the spatial semantic feature of each of the plurality of characters, and the character information of each of the plurality of characters, may be inputted into the pre-trained edge type recognition model. The edge type recognition model may perform a two-class classification on each edge based on the spatial semantic feature and the character information, to output that it is whether to be of several pre-defined edge types. Based on the output result, the edge type of each edge may be determined.

For example, there are six categories: sequence, cell end to end, row end to end, paragraph end to end, block end to end, and column end to end. It is necessary to determine whether it is or not to be each of these 6 categories during recognition. If it is not, it is recognized as other categories.

In some embodiments, when generating the types of the edges based on the spatial semantic feature of each of the plurality of characters, and the character information of each of the plurality of characters, the spatial semantic feature of each of the plurality of characters and the character information of each of the plurality of characters are inputted into the edge type recognition model to generate the types of the edges. Thus, using the edge types of the character-connected edges obtained by the edge type recognition model, and the vertex types, to generate the document layout, the accuracy of document layout analysis is greatly improved.

Figure 7:
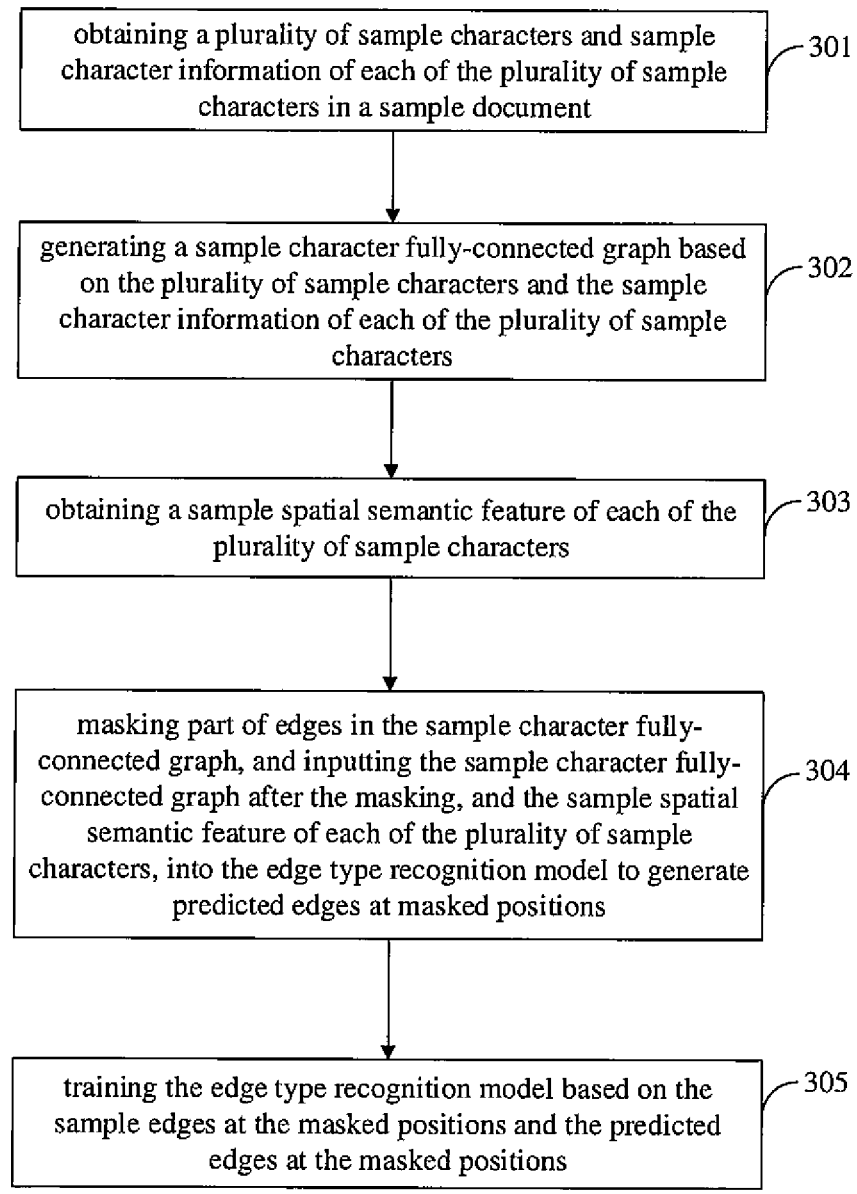
FIG. 7 is a flowchart illustrating a method for obtaining a document layout according to embodiments of the disclosure.

In some embodiments of the disclosure, the edge type recognition model may be obtained by training in the manner illustrated in FIG. 7. FIG. 7 is a flowchart illustrating a method for obtaining a document layout according to embodiments of the disclosure.

As illustrated in FIG. 7, the edge type recognition model may be trained through the following.

At block 301, a plurality of sample characters and sample character information of each of the plurality of sample characters in a sample document are obtained.

At block 302, a sample character fully-connected graph is generated based on the plurality of sample characters and the sample character information of each of the plurality of sample characters.

In some embodiments, actions at blocks 301-302 are similar to the above-mentioned actions at blocks 201-202, which will not be repeated here.

At block 303, a sample spatial semantic feature of each of the plurality of sample characters is obtained.

In some embodiments, the sample characters may be entered into a spatial language model to obtain the sample spatial semantic feature of each sample character.

At block 304, part of edges in the sample character fully-connected graph is masked, and the sample character fully-connected graph after the masking, and the sample spatial semantic feature of each of the plurality of sample characters, are inputted into the edge type recognition model to generate predicted edges at masked positions.

In some embodiments, the part of the edges in the sample character fully-connected graph may be masked. For example, some edges are replaced with unknown edges. Then the sample character fully-connected graph after the masking, and the sample spatial semantic feature of each of the plurality of sample characters are inputted into the edge type recognition model for prediction. The edge type recognition model outputs predicted edges based on the unmasked sample edges in the sample character fully-connected graph.

Figure 8:
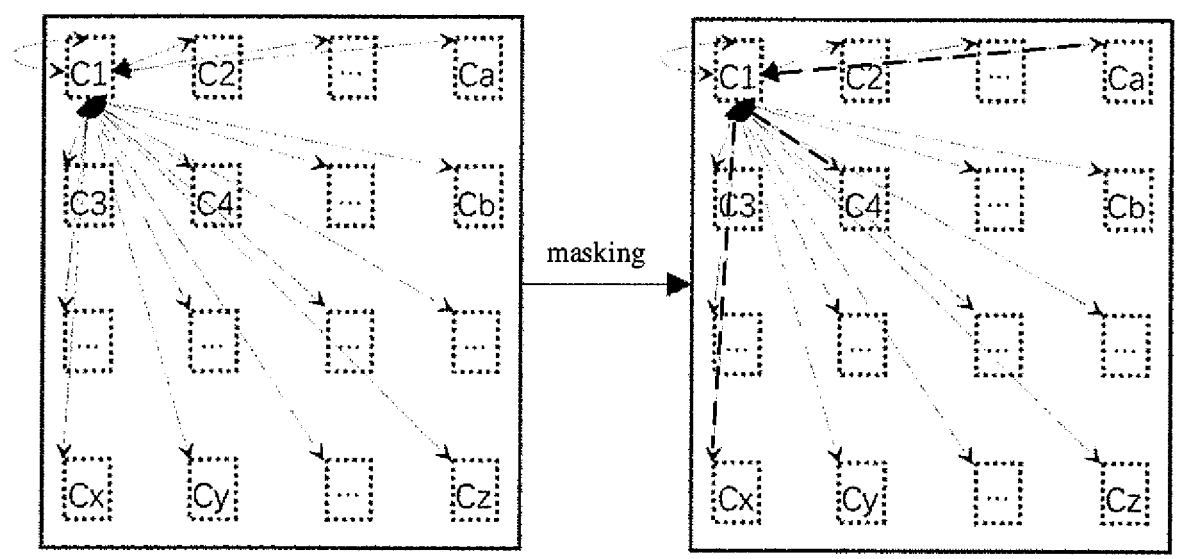
FIG. 8 is a diagram illustrating a process for masking edges according to embodiments of the disclosure.

FIG. 8 is a diagram illustrating a process for masking edges according to embodiments of the disclosure. In FIG. 8, the part of the edges in the sample character fully-connected graph may be modified: the edges from C1 to Ca, C1 to C4, and C1 to Cx are modified to unknown "UNK" edges, as illustrated by the thick dashed lines in FIG. 8.

At block 305, the edge type recognition model is trained based on the sample edges at the masked positions and the predicted edges at the masked positions.

In some embodiments, the loss value is calculated based on the sample edges at the masked positions and the predicted edges at the masked positions. If the loss value is greater than the preset second loss threshold, the parameters of the edge type recognition model are adjusted. Then, the sample character fully-connected graph after the masking, of the next sample document, may be inputted into the adjusted edge type recognition model. After that, the loss value is calculated based on the sample edges at the masked positions and the predicted edges at the masked positions, and it is determined whether the loss value is greater than the preset second loss threshold. If the loss value is greater than the preset second loss threshold, parameters of the edge type recognition model are adjusted and the model is continued to be trained until the loss value is less than the preset second loss threshold, and the training ends.

In the embodiments of the disclosure, the part of the edges in the sample character fully-connected graph corresponding to the sample document may be masked, and the sample character fully-connected graph after the masking and the sample spatial semantic feature of each of the plurality of sample characters are inputted into the edge type recognition model to generate the predicted edges at the masked positions. Therefore, training is performed based on the sample character fully-connected graph after the masking, the edge type recognition model obtained through training may predict the edge types of the masked edges.

In order to improve the accuracy of document layout analysis, when obtaining the plurality of characters in the target document, a character detection model may also be used to detect the plurality of characters in some embodiment of the disclosure.

In detail, in order to make full use of the image visual information, the image of the target document is input to the pre-trained character detection model, and the character detection model outputs the plurality of characters.

In the embodiments of the disclosure, when obtaining the plurality of characters in the target document, the target document may be inputted into the character detection model to obtain the plurality of characters in the target document. Therefore, the plurality of characters obtained through the character detection model are used to generate the document layout, which greatly improves the accuracy of document layout analysis.

Figure 9:
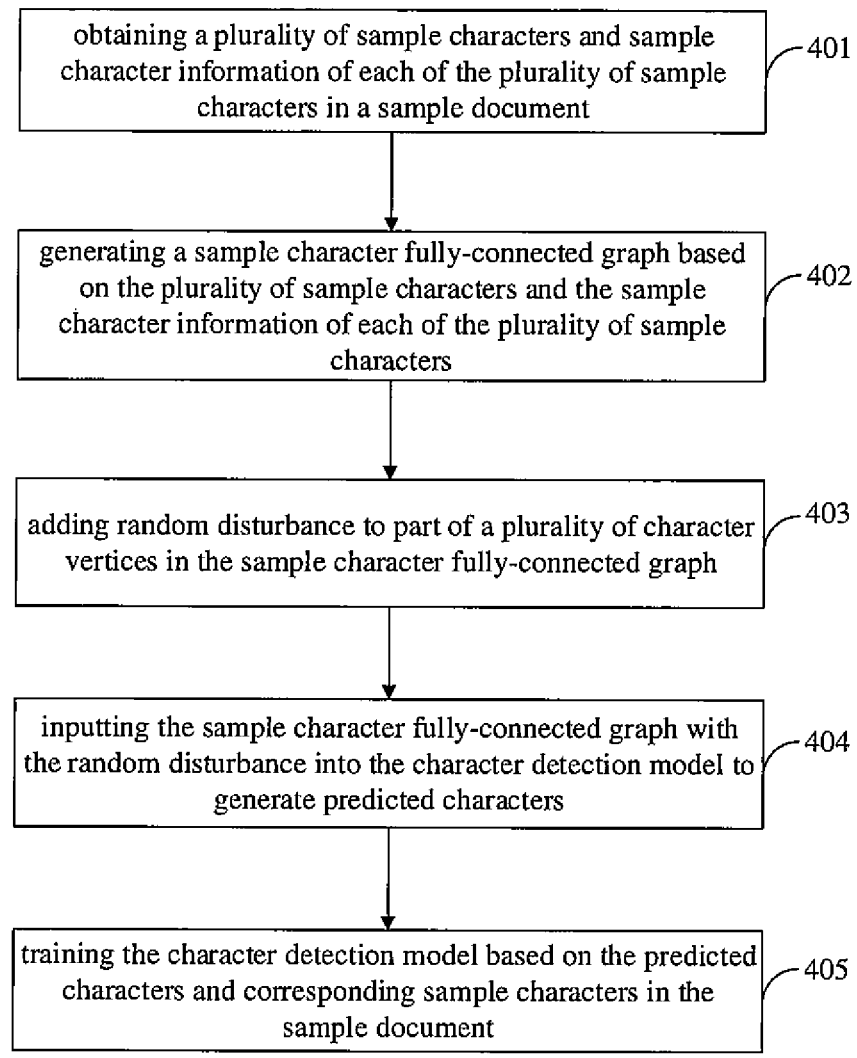
FIG. 9 is a flowchart illustrating a method for obtaining a document layout according to embodiments of the disclosure.

In some embodiments of the disclosure, the character detection model may be obtained by training in the manner illustrated in FIG. 9. FIG. 9 is a flowchart illustrating a method for obtaining a document layout according to embodiments of the disclosure.

As illustrated in FIG. 9, the character detection model may be trained through the following.

At block 401, a plurality of sample characters and sample character information of each of the plurality of sample characters in a sample document are obtained.

At block 402, a sample character fully-connected graph is generated based on the plurality of sample characters and the sample character information of each of the plurality of sample characters.

In some embodiments, actions at blocks 401-402 are similar to the above-mentioned actions at blocks 201-202, which will not be repeated here.

At block 403, random disturbance is added to part of a plurality of character vertices in the sample character fully-connected graph.

In some embodiments, some character vertices may be selected in the sample character fully-connected graph, and random disturbance may be added to these selected character vertices, such as changing the sizes of the characters or adjusting the positions of the characters.

Figure 10:
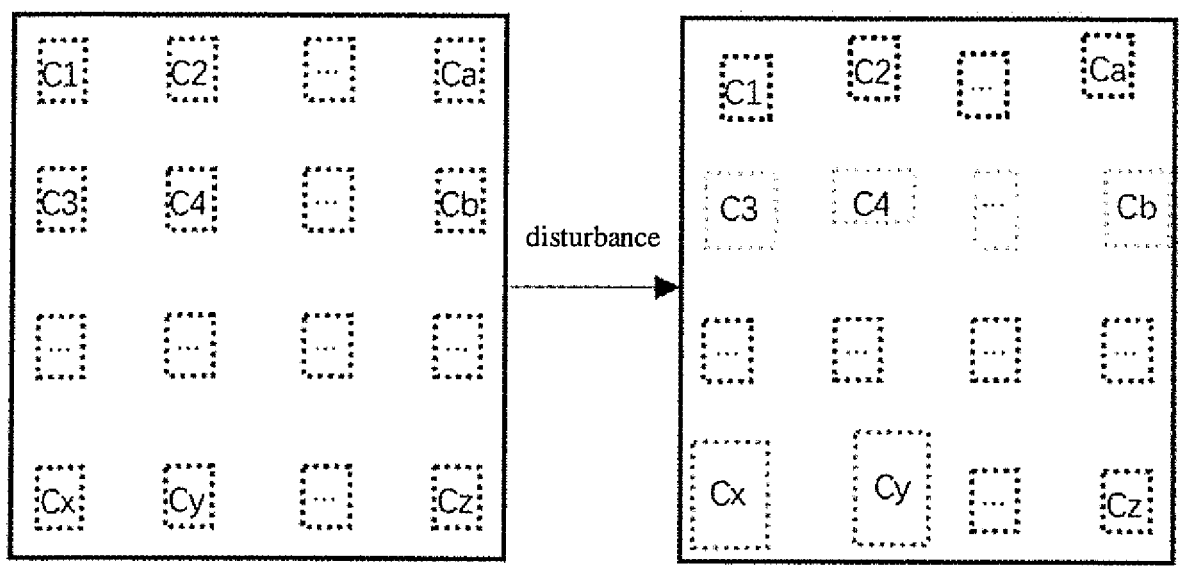
FIG. 10 is a diagram illustrating a process for adding random disturbance according to embodiments of the disclosure.

FIG. 10 is a diagram illustrating a process for adding random disturbance according to embodiments of the disclosure. In FIG. 10, random disturbance may be added to some of the characters in the sample character fully-connected graph. In detail, the positions of characters C1, C2, . . . , Ca are adjusted, the sizes of characters C3, C4, . . . , Cb are adjusted, the positions and sizes of Cy and Cy are adjusted, and the character Cz and other characters remain unchanged.

At block 404, the sample character fully-connected graph with the random disturbance is inputted into the character detection model to generate predicted characters.

In some embodiments, the sample character fully-connected graph with the random disturbance is input into the pre-trained character detection model, and the character detection model generates the predicted characters, which include the positions and sizes of the predicted characters.

At block 405, the character detection model is trained based on the predicted characters and corresponding sample characters in the sample document.

In some embodiments, the loss value of each sample character is calculated according to each predicted character and the sample character in the corresponding position in the sample document, and the average loss value of all sample characters is calculated. If the average loss value is greater than the preset third loss threshold, the parameters of the character detection model are adjusted. Then, the sample character fully-connected graph with the random disturbance, of the next sample document, may be inputted into the adjusted character detection model. After that, the average loss value is calculated based on the predicted characters and the sample characters in the sample document, and it is determined whether the average loss value is greater than the preset third loss threshold. If it is greater than the preset third loss threshold, the model parameters may be adjusted and the training continues until the loss value is less than the preset third loss threshold, and the training ends.

In the embodiments of the disclosure, the sample character fully-connected graph with the random disturbance is inputted into the character detection model to generate the predicted characters, and the character detection model is trained based on the predicted characters and corresponding sample characters in the sample document. Thus, training is performed based on the sample character fully-connected graph with the random disturbance, so that the character detection model obtained through training may predict the precise position of each character.

Figure 11:
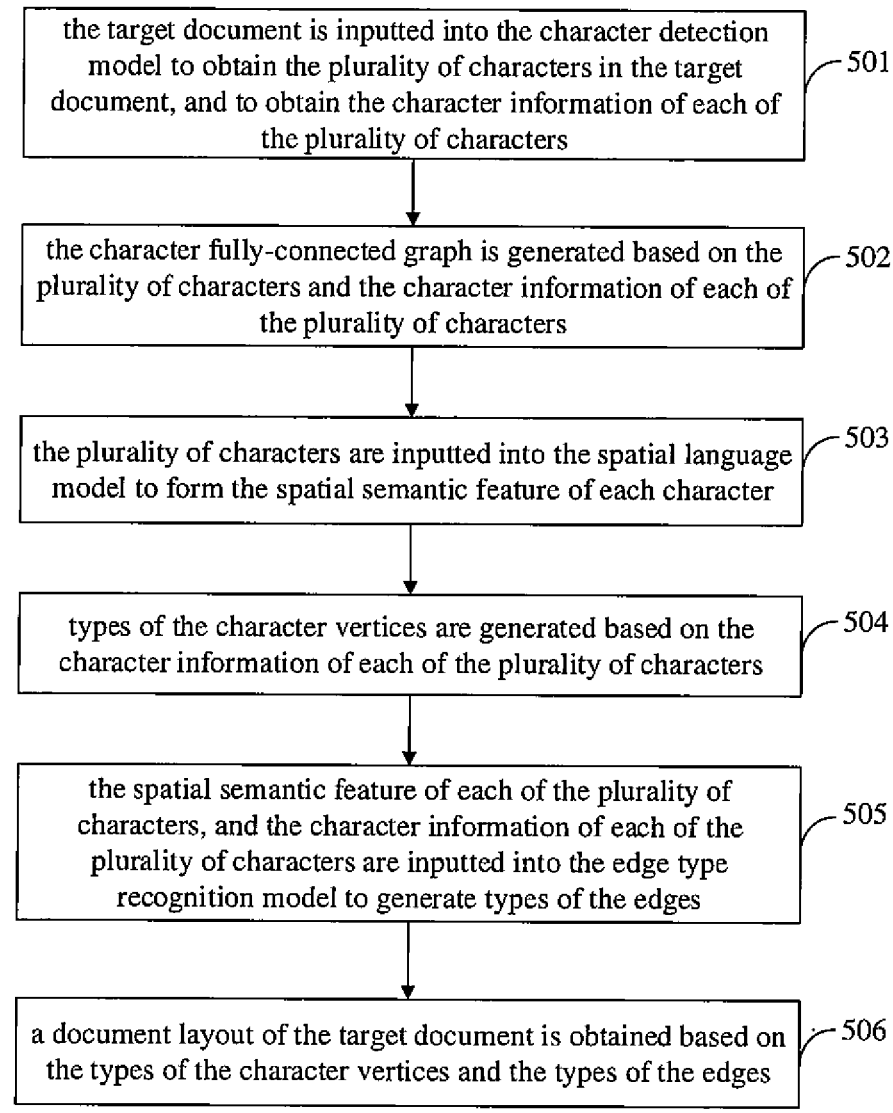
FIG. 11 is a flowchart illustrating a method for obtaining a document layout according to embodiments of the disclosure.

In some embodiments of the disclosure, when analyzing the document layout, the above three models may be used, which will be described below with reference to FIG. 11. FIG. 11 is a flowchart illustrating a method for obtaining a document layout according to embodiments of the disclosure.

As illustrated in FIG. 11, the method may include the following.

At block 501, the target document is inputted into the character detection model to obtain the plurality of characters in the target document, and to obtain the character information of each of the plurality of characters.

In some embodiments, the pre-trained character detection model can be used to detect the image of the target document, to obtain the plurality of characters in the target document, and to obtain the character information of each of the plurality of characters, such as position and size.

At block 502, the character fully-connected graph is generated based on the plurality of characters and the character information of each of the plurality of characters.

In some embodiments, the action at block 502 is similar to the action at block 102 described above, so it will not be repeated here.

At block 503, the plurality of characters are inputted into the spatial language model to form the spatial semantic feature of each character.

In some embodiments, the plurality of characters can be input into the spatial language model, and the spatial semantic feature of each character can be obtained through the spatial language model.

At block 504, types of the character vertices are generated based on the character information of each of the plurality of characters.

In some embodiments, the action at block 504 is similar to the action at block 104 described above, so it will not be repeated here.

At block 505, the spatial semantic feature of each of the plurality of characters, and the character information of each of the plurality of characters are inputted into the edge type recognition model to generate types of the edges.

In detail, the spatial semantic features and character information of the plurality of characters are input into the pre-trained edge type recognition model, and the edge type recognition model outputs the type of each edge.

At block 506, a document layout of the target document is obtained based on the types of the character vertices and the types of the edges.

In some embodiments, the action at block 506 is similar to the action at block 106 described above, so it will not be repeated here.

In the embodiments of the disclosure, the plurality of characters in the target document may be obtained by using the character detection model; the spatial semantic feature of each character may be obtained by using the spatial language model; and the edge type of each edge may be obtained by using the edge type recognition model. The characters, the spatial semantic features of the characters, and the edge types, obtained by the models, are used to obtain the document layout, which greatly improves the accuracy of document layout analysis.

In order to implement the above embodiments, the disclosure provides an apparatus for obtaining a document layout.

Figure 12:
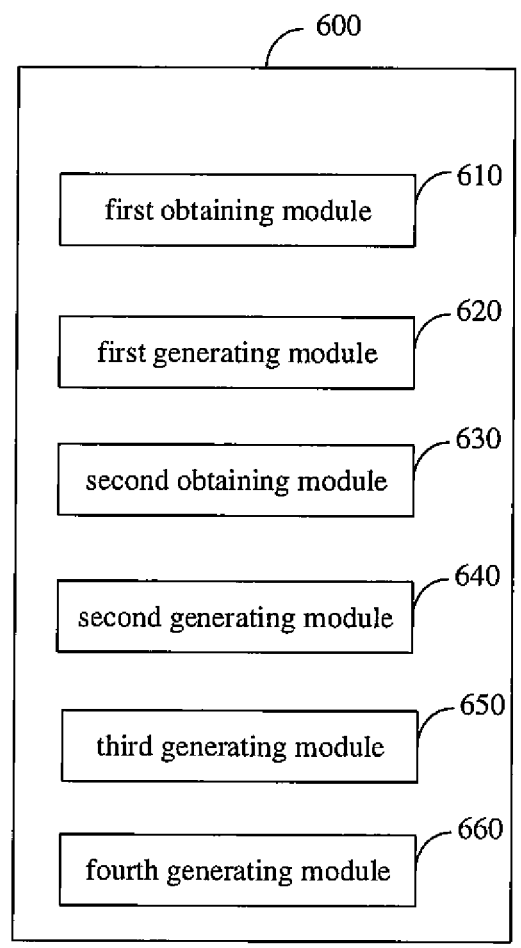
FIG. 12 is a block diagram illustrating an apparatus for obtaining a document layout according to embodiments of the disclosure.

FIG. 12 is a block diagram illustrated an apparatus for obtaining a document layout according to embodiments of the disclosure. As illustrated in FIG. 12, the apparatus 600 may include: a first obtaining module 610, a first generating module 620, a second obtaining module 630, a second generating module 640, a third generating module 650, and a fourth generating module 660.

The first obtaining module 610 is configured to obtain a plurality of characters and character information of each of the plurality of characters in a target document The first generating module 620 is configured to generate a character fully-connected graph based on the plurality of characters and the character information of each of the plurality of characters, in which the character fully-connected graph includes a plurality of character vertices and edges among the plurality of character vertices.

The second obtaining module 630 is configured to obtain a spatial semantic feature of each of the plurality of characters.

The second generating module 640 is configured to generate types of the character vertices based on the character information of each of the plurality of characters.

The third generating module 650 is configured to generate types of the edges based on the spatial semantic feature of each of the plurality of characters, and the character information of each of the plurality of characters.

The fourth generating module 660 is configured to obtain a document layout of the target document based on the types of the character vertices and the types of the edges.

In some embodiments, the second obtaining module 630 is configured to input the plurality of characters into a spatial language model to form the spatial semantic feature of each of the plurality of characters.

In some embodiments, the spatial language model is obtained through training in the following acts: obtaining a plurality of sample characters and sample character information of each of the plurality of sample characters in a sample document; generating a sample character fully-connected graph based on the plurality of sample characters and the sample character information of each of the plurality of sample characters; masking part of the plurality of sample characters in the sample character fully-connected graph; inputting the sample character fully-connected graph after the masking into the spatial language model to generate predicted characters at masked positions; and training the spatial language model based on the sample characters at the masked positions and the predicted characters at the masked positions.

In some embodiments, the third generating module 650 is configured to input the spatial semantic feature of each of the plurality of characters, and the character information of each of the plurality of characters, into an edge type recognition model to generate the types of the edges.

In some embodiments, the edge type recognition model is obtained through training in the following acts: obtaining a plurality of sample characters and sample character information of each of the plurality of sample characters in a sample document; generating a sample character fully-connected graph based on the plurality of sample characters and the sample character information of each of the plurality of sample characters; obtaining a sample spatial semantic feature of each of the plurality of sample characters; masking part of edges in the sample character fully-connected graph; inputting the sample character fully-connected graph after the masking, and the sample spatial semantic feature of each of the plurality of sample characters, into the edge type recognition model to generate predicted edges at masked positions; and training the edge type recognition model based on the sample edges at the masked positions and the predicted edges at the masked positions.

In some embodiments, the first obtaining module 610 is configured to input the target document into a character detection model to obtain the plurality of characters in the target document.

In some embodiments, the character detection model is obtained through training in the following acts: obtaining a plurality of sample characters and sample character information of each of the plurality of sample characters in a sample document; generating a sample character fully-connected graph based on the plurality of sample characters and the sample character information of each of the plurality of sample characters; adding random disturbance to part of a plurality of character vertices in the sample character fully-connected graph; inputting the sample character fully-connected graph with the random disturbance into the character detection model to generate predicted characters; training the character detection model based on the predicted characters and corresponding sample characters in the sample document.

It should be noted that the interpretation of the above embodiments of the method is also applicable to the apparatus of the embodiments, so it will not be repeated here.

According to the embodiments of the disclosure, the disclosure also provides an electronic device and a readable storage medium.

Figure 13:
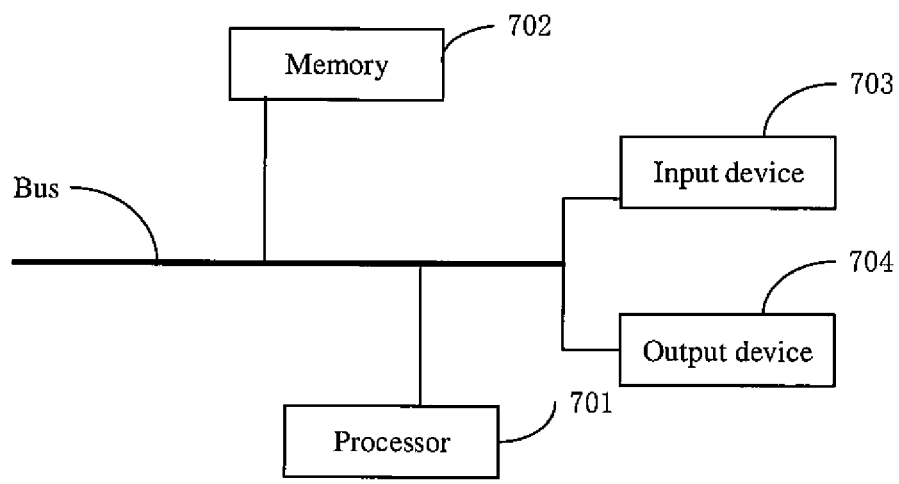
FIG. 13 is a block diagram illustrating an electronic device for implementing a method for obtaining a document layout according to embodiments of the disclosure.

FIG. 13 is a block diagram illustrating an electronic device for implementing a method for obtaining a document layout according to embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 13, the electronic device includes: one or more processors 701, a memory 702, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 701 is taken as an example in FIG. 13.

The memory 702 is a non-transitory computer-readable storage medium according to the disclosure. The memory stores instructions executable by at least one processor, so that the at least one processor executes the method according to the disclosure. The non-transitory computer-readable storage medium of the disclosure stores computer instructions, which are used to cause a computer to execute the method according to the disclosure.

As a non-transitory computer-readable storage medium, the memory 702 is configured to store non-transitory software programs, non-transitory computer executable programs and modules, such as program instructions/modules corresponding to the method in the embodiment of the disclosure (For example, the first obtaining module 610, the first generating module 620, the second obtaining module 630, the second generating module 640, the third generating module 650, and the fourth generating module 660 shown in FIG. 12). The processor 701 executes various functional applications and data processing of the server by running non-transitory software programs, instructions, and modules stored in the memory 702, that is, implementing the method in the foregoing method embodiments.

The memory 702 may include a storage program area and a storage data area, where the storage program area may store an operating system and application programs required for at least one function. The storage data area may store data created according to the use of the electronic device for implementing the method. In addition, the memory 702 may include a high-speed random-access memory, and a non-transitory memory, such as at least one magnetic disk storage device, a flash memory device, or other non-transitory solid-state storage device. In some embodiments, the memory 702 may optionally include a memory remotely disposed with respect to the processor 701, and these remote memories may be connected to the electronic device for implementing the method through a network. Examples of the above network include, but are not limited to, the Internet, an intranet, a local area network, a mobile communication network, and combinations thereof.

The electronic device for implementing the method may further include: an input device 703 and an output device 704. The processor 701, the memory 702, the input device 703, and the output device 704 may be connected through a bus or in other manners. In FIG. 12, the connection through the bus is taken as an example.

The input device 703 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 704 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general-purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

According to the embodiments of the disclosure, the corpus text is input into the model cyclically (that is, input the text twice into the model), and when the text is input into the model for the first time, only text vectors of the segments in the text are generated. At this time, the mask is not predicted and learned. When the corpus text is input into the model for the second time, since the text vector information of the segments input at the first time are obtained at this time, the mask is predicted by the model based on the text vector information corresponding to the segments input at the first time, and the segments currently input at the second time. The training of the model is realized by returning gradients based on correctness and incorrectness of the prediction of the mask, so that the trained model is enabled to handle texts with a length beyond 512. Since the disclosure adopts the segment modeling mode, for a text with a length within 512, modeling could be realized rapidly, and modeling speed is improved. Since the corpus text is input twice in a loop, context information is obtained for each segment, which improves performance of the trained model, makes the performance of the trained model better, and effectively improves effects of the NLP tasks.

It should be understood that various forms of processes shown above may be used to reorder, add, or delete steps. For example, the steps described in the disclosure may be performed in parallel, sequentially, or in different orders. As long as the desired results of the technical solutions disclosed in the disclosure can be achieved, no limitation is made herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for obtaining a document layout, comprising:
   obtaining a plurality of characters and character information of each of the plurality of characters in a target document;
   generating a character fully-connected graph based on the plurality of characters and the character information of each of the plurality of characters, wherein the character fully-connected graph comprises a plurality of character vertices and edges among the plurality of character vertices;
   obtaining a spatial semantic feature of each of the plurality of characters;
   generating types of the character vertices based on the character information of each of the plurality of characters; generating types of the edges based on the spatial semantic feature of each of the plurality of characters, and the character information of each of the plurality of characters; and
   obtaining a document layout of the target document based on the types of the character vertices and the types of the edges;
   wherein obtaining the spatial semantic feature of each of the plurality of characters comprises:
   inputting the plurality of characters into a spatial language model to form the spatial semantic feature of each of the plurality of characters,
   wherein the spatial language model is obtained through training in the following acts:
   obtaining a plurality of sample characters and sample character information of each of the plurality of sample characters in a sample document;
   generating a sample character fully-connected graph based on the plurality of sample characters and the sample character information of each of the plurality of sample characters;
   masking part of the plurality of sample characters in the sample character fully-connected graph;

inputting the sample character fully-connected graph after the masking into the spatial language model to generate predicted characters at masked positions; and
training the spatial language model based on the sample characters at the masked positions and the predicted characters at the masked positions.

2. The method of claim 1, wherein generating the types of the edges based on the spatial semantic feature of each of the plurality of characters, and the character information of each of the plurality of characters, comprises:
inputting the spatial semantic feature of each of the plurality of characters, and the character information of each of the plurality of characters, into an edge type recognition model to generate the types of the edges.

3. The method of claim 2, wherein the edge type recognition model is obtained through training in the following acts:
obtaining a plurality of sample characters and sample character information of each of the plurality of sample characters in a sample document;
generating a sample character fully-connected graph based on the plurality of sample characters and the sample character information of each of the plurality of sample characters;
obtaining a sample spatial semantic feature of each of the plurality of sample characters;
masking part of edges in the sample character fully-connected graph;
inputting the sample character fully-connected graph after the masking, and the sample spatial semantic feature of each of the plurality of sample characters, into the edge type recognition model to generate predicted edges at masked positions; and
training the edge type recognition model based on the sample edges at the masked positions and the predicted edges at the masked positions.

4. The method of claim 1, wherein obtaining the plurality of characters in the target document comprises:
inputting the target document into a character detection model to obtain the plurality of characters in the target document.

5. The method of claim 4, wherein the character detection model is obtained through training in the following acts:
obtaining a plurality of sample characters and sample character information of each of the plurality of sample characters in a sample document;
generating a sample character fully-connected graph based on the plurality of sample characters and the sample character information of each of the plurality of sample characters;
adding random disturbance to part of a plurality of character vertices in the sample character fully-connected graph;
inputting the sample character fully-connected graph with the random disturbance into the character detection model to generate predicted characters;
training the character detection model based on the predicted characters and corresponding sample characters in the sample document.

6. An electronic device, comprising:
at least one processor; and
a storage device connected in communication with the at least one processor; wherein,
the storage device stores instructions executable by the at least one processor, and when the instructions are executed by the at least one processor, the at least one processor is caused to implement:

obtaining a plurality of characters and character information of each of the plurality of characters in a target document;
generating a character fully-connected graph based on the plurality of characters and the character information of each of the plurality of characters, wherein the character fully-connected graph comprises a plurality of character vertices and edges among the plurality of character vertices;
obtaining a spatial semantic feature of each of the plurality of characters;
generating types of the character vertices based on the character information of each of the plurality of characters;
generating types of the edges based on the spatial semantic feature of each of the plurality of characters, and the character information of each of the plurality of characters; and
obtaining a document layout of the target document based on the types of the character vertices and the types of the edges;
wherein obtaining the spatial semantic feature of each of the plurality of characters comprises:
inputting the plurality of characters into a spatial language model to form the spatial semantic feature of each of the plurality of characters,
wherein the spatial language model is obtained through training in the following acts:
obtaining a plurality of sample characters and sample character information of each of the plurality of sample characters in a sample document;
generating a sample character fully-connected graph based on the plurality of sample characters and the sample character information of each of the plurality of sample characters;
masking part of the plurality of sample characters in the sample character fully-connected graph;
inputting the sample character fully-connected graph after the masking into the spatial language model to generate predicted characters at masked positions; and
training the spatial language model based on the sample characters at the masked positions and the predicted characters at the masked positions.

7. The electronic device of claim 6, wherein generating the types of the edges based on the spatial semantic feature of each of the plurality of characters, and the character information of each of the plurality of characters, comprises:
inputting the spatial semantic feature of each of the plurality of characters, and the character information of each of the plurality of characters, into an edge type recognition model to generate the types of the edges.

8. The electronic device of claim 7, wherein the edge type recognition model is obtained through training in the following acts:
obtaining a plurality of sample characters and sample character information of each of the plurality of sample characters in a sample document;
generating a sample character fully-connected graph based on the plurality of sample characters and the sample character information of each of the plurality of sample characters;
obtaining a sample spatial semantic feature of each of the plurality of sample characters;
masking part of edges in the sample character fully-connected graph;
inputting the sample character fully-connected graph after the masking, and the sample spatial semantic feature of each of the plurality of sample characters, into the edge type recognition model to generate predicted edges at masked positions; and training the edge type recognition model based on the sample edges at the masked positions and the predicted edges at the masked positions.

9. The electronic device of claim 6, wherein obtaining the plurality of characters in the target document comprises:

inputting the target document into a character detection model to obtain the plurality of characters in the target document.

10. The electronic device of claim 9, wherein the character detection model is obtained through training in the following acts:

obtaining a plurality of sample characters and sample character information of each of the plurality of sample characters in a sample document;

generating a sample character fully-connected graph based on the plurality of sample characters and the sample character information of each of the plurality of sample characters;

adding random disturbance to part of a plurality of character vertices in the sample character fully-connected graph;

inputting the sample character fully-connected graph with the random disturbance into the character detection model to generate predicted characters;

training the character detection model based on the predicted characters and corresponding sample characters in the sample document.

11. A non-transitory computer-readable storage medium storing computer instructions, wherein when the computer instructions are executed, a computer is caused to implement a method for obtaining a document layout, the method comprising:

obtaining a plurality of characters and character information of each of the plurality of characters in a target document;

generating a character fully-connected graph based on the plurality of characters and the character information of each of the plurality of characters, wherein the character fully-connected graph comprises a plurality of character vertices and edges among the plurality of character vertices;

obtaining a spatial semantic feature of each of the plurality of characters;

generating types of the character vertices based on the character information of each of the plurality of characters;

generating types of the edges based on the spatial semantic feature of each of the plurality of characters, and the character information of each of the plurality of characters; and obtaining a document layout of the target document based on the types of the character vertices and the types of the edges;

wherein obtaining the spatial semantic feature of each of the plurality of characters comprises:

inputting the plurality of characters into a spatial language model to form the spatial semantic feature of each of the plurality of characters, wherein the spatial language model is obtained through training in the following acts:

obtaining a plurality of sample characters and sample character information of each of the plurality of sample characters in a sample document;

generating a sample character fully-connected graph based on the plurality of sample characters and the sample character information of each of the plurality of sample characters;

masking part of the plurality of sample characters in the sample character fully-connected graph;

inputting the sample character fully-connected graph after the masking into the spatial language model to generate predicted characters at masked positions; and training the spatial language model based on the sample characters at the masked positions and the predicted characters at the masked positions.

12. The non-transitory computer-readable storage medium of claim 11, wherein generating the types of the edges based on the spatial semantic feature of each of the plurality of characters, and the character information of each of the plurality of characters, comprises:

inputting the spatial semantic feature of each of the plurality of characters, and the character information of each of the plurality of characters, into an edge type recognition model to generate the types of the edges.

13. The non-transitory computer-readable storage medium of claim 12, wherein the edge type recognition model is obtained through training in the following acts:

obtaining a plurality of sample characters and sample character information of each of the plurality of sample characters in a sample document;

generating a sample character fully-connected graph based on the plurality of sample characters and the sample character information of each of the plurality of sample characters;

obtaining a sample spatial semantic feature of each of the plurality of sample characters;

masking part of edges in the sample character fully-connected graph;

inputting the sample character fully-connected graph after the masking, and the sample spatial semantic feature of each of the plurality of sample characters, into the edge type recognition model to generate predicted edges at masked positions; and training the edge type recognition model based on the sample edges at the masked positions and the predicted edges at the masked positions.

14. The non-transitory computer-readable storage medium of claim 11, wherein obtaining the plurality of characters in the target document comprises:

inputting the target document into a character detection model to obtain the plurality of characters in the target document;

wherein the character detection model is obtained through training in the following acts:

obtaining a plurality of sample characters and sample character information of each of the plurality of sample characters in a sample document;

generating a sample character fully-connected graph based on the plurality of sample characters and the sample character information of each of the plurality of sample characters;

adding random disturbance to part of a plurality of character vertices in the sample character fully-connected graph;

inputting the sample character fully-connected graph with the random disturbance into the character detection model to generate predicted characters;

training the character detection model based on the predicted characters and corresponding sample characters in the sample document.

\* \* \* \* \*